Patented Feb. 10, 1942

2,272,267

UNITED STATES PATENT OFFICE 2,272,267

ALKALINE EARTH METAL SALTS OF DIHYDROXY HEXACHLORO DIPHENYL METHANE

William S. Gump, Nutley, N. J., assignor to Burton T. Bush, Inc., New York, N. Y., a corporation of New Jersey No Drawing. Application December 17, 1940, Serial No. 370,485

4 Claims. (Cl. 260—619)

This invention relates to a class of new substances, namely, the alkaline earth metal salts of 2,2'-dihydroxy-3,5,6-3',5',6'-hexachloro diphenyl methane.

These metal salts may be formed from 2,2'-dihydroxy-3,5,6-3',5',6'-hexachloro diphenyl methane (M. P. 161°-162° C.) and the alkaline earth metals, e. g. barium, calcium, strontium, magnesium. In general, the method employed comprises effecting a double decomposition of a soluble salt of the alkaline earth metal with an alkali metal salt of 2,2'-dihydroxy-3,5,6-3',5',6'-hexachloro diphenyl methane in solution.

The salts of this invention are white, crystalline, substantially odorless substances which do not melt but decompose, upon heating, at varying temperatures in the neighborhood of 260° C. They are slightly soluble in water at room temperature, e. g. about 20-25° C., and more soluble in boiling water. Their solubility in alcohol and acetone, even at room temperatures, is greater than their solubility in boiling water. The salts are more soluble in dilute alkalies than in water.

The substances of this invention may be used as antiseptic, bactericidal, bacteriostatic, fungicidal and preservative agents, in solid, liquid or emulsion form, either per se or in admixture with other substances.

The following illustrates how certain of these alkaline earth metal salts may be prepared.

*The preparation of the mono-calcium salt of 2,2'-dihydroxy-3,5,6-3',5',6'-hexachloro diphenyl methane, having the probable structural formula:*

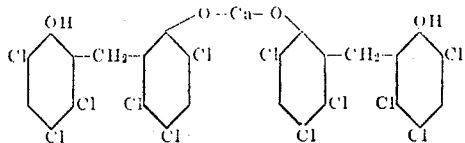

4.1 grams of sodium hydroxide (96%) are dissolved in 25 cc. of water at room temperature and this solution is added to a solution (also maintained at or near room temperature) of 2,2'-dihydroxy-3,5,6-3',5',6'-hexachloro diphenyl methane prepared by dissolving 40.7 grams of the 2,2'-dihydroxy-3,5,6-3',5',6'-hexachloro diphenyl methane in 25 cc. of acetone at about 50° C. To the resulting solution, a solution (kept at or near room temperature) of 6.25 grams of hydrated calcium chloride (88% CaCl₂) in 500 cc. of water is then added slowly and with stirring. The precipitate which forms is washed with about 50 cc. water at room temperature and dried for a day at 100° C. A yield of 43 grams of the mono-calcium salt of 2,2'-dihydroxy-3,5,6-3',5',6'-hexachloro diphenyl methane is obtained.

Analysis of the product shows that it contains the theoretical amount of calcium and upon acidification forms the theoretical amount of original phenol required by the mono-calcium salt of 2,2'-dihydroxy-3,5,6-3',5',6'-hexachloro diphenyl methane.

By substituting an equivalent amount of barium chloride (10.4 grams), strontium chloride (7.9 grams), or magnesium sulfate (6.0 grams), for the calcium chloride used in the above example and proceeding in a similar manner thereto, the mono-barium, mono-strontium or mono-magnesium salts of 2,2'-dihydroxy-3,5,6-3',5',6'-hexachloro diphenyl methane, respectively, are obtained. The yields obtained are 45 grams of the barium salt, 44 grams of the strontium salt, and 43.5 grams of the magnesium salt. The physical properties possessed by these three latter-named salts are substantially the same as those of the calcium salt. All the salts are white, crystalline, substantially odorless and colorless solids, soluble in dilute alkali solutions and in organic liquids such as, for example, acetone and alcohol. Other characteristics of the salts are shown by the following table:

| Salt | Solubility of salt in water at 20° C. | Solubility of salt in boiling water | Temperatures of decomposition of salt |
|---|---|---|---|
| Mono-calcium salt of 2,2'-dihydroxy-3, 5, 6-3', 5', 6'-hexachloro diphenyl methane. | 1 part*/5,000 parts water. | 1 part/1,000 parts water. | About 260° C. discoloration. |
| Mono-barium salt of 2,2'-dihydroxy-3, 5, 6-3', 5', 6'-hexachloro diphenyl methane. | 1 part/50,000 parts water. | 1 part/5,000 parts water. | Do. |
| Mono - strontium salt of 2,2'-dihydroxy-3, 5, 6-3', 5', 6'-hexachloro diphenyl methane. | 1 part/4,000 parts water. | 1 part/1,500 parts water. | Do. |
| Mono - magnesium salt of 2,2'-dihydroxy-3, 5, 6-3', 5', 6'-hexachloro diphenyl methane. | 1 part/6,000 parts water. | 1 part/1,000 parts water. | Do. |

*All parts in table are by weight.

In similar manner, the zinc salts of 2,2'-dihydroxy-3,5,6-3',5',6'-hexachloro diphenyl methane may be formed by using ZnSO₄ (8.1 grams) in place of CaCl₂ in the example given for the preparation of the mono-calcium salt of 2,2'-dihydroxy-3,5,6-3',5',6'-hexachloro diphenyl methane. 44 grams of the mono-zinc salt of 2,2'-dihydroxy-3,5,6-3',5',6'-hexachloro diphenyl methane are obtained. This is a white, practically odorless solid and discolors upon heating at around 260° C. In general, this zinc salt of 2,2'-dihydroxy - 3,5,6 - 3',5',6' - hexachloro diphenyl methane exhibits poorer solubility characteristics than do the salts of calcium, barium, strontium, and magnesium.

The 2,2' - dihydroxy - 3,5,6-3',5',6'-hexachloro diphenyl methane mentioned in this application is a novel chemical substance, which together with the process of making it, is described and claimed in a co-pending application of the present applicant, S. N. 262,635, filed March 18, 1939, now Patent No. 2,250,480. The present application is a continuation-in-part of application, S. N. 262,635.

2,2' - dihydroxy - 3,5,6-3',5',6'- hexachloro diphenyl methane is obtained by the reaction of two molecules of 2,4,5-trichlorophenol with one molecule of formaldehyde in the presence of an acid condensing agent. The purified reaction product is a white, crystalline material having a melting point of 161°–162° C. More particularly, the method for making 2,2'-dihydroxy-3,5,6-3',5',6'-hexachloro diphenyl methane is as follows:

A mixture prepared from 200 parts 2,4,5-trichlorophenol, 36 parts methanol and 40 parts 35–40% formaldehyde solution is slowly added to 1440 parts sulfuric acid 93% with agitation, keeping the temperature between 0 and 5° C. The addition of the mixture should take about 4 hours, and when this point is reached, the agitation is continued for approximately 20 hours while maintaining the temperature at about 5° C. The finished reaction mixture is quenched on crushed ice and the crude dihydroxy hexachloro diphenyl methane is separated from the acid by filtration followed by washing with water. On drying, 200 parts of the crude product are obtained. The tan colored crude material is refined by dissolution in 15% aqueous sodium hydroxide solution, enough of this solution being employed so as to form the di-sodium salt of the dihydroxy hexachloro diphenyl methane. The alkaline solution is filtered to remove small amounts of alkali insoluble by-products formed in the reaction and the clear filtrate is acidified using hydrochloric or sulfuric acid in order to reprecipitate the phenolic compound. After washing the precipitate free from acid and drying, the compound is further refined by crystallization from benzene, toluene or ethylene dichloride, yielding thus a first crop of 100—110 parts of the pure dihydroxy hexachloro diphenyl methane in the form of white needles having a melting point of 161°–162° C.

While the invention has been described in detail as to method and products, it is understood that changes may be made pertaining to both and hence, no limitations on the invention are intended other than those imposed by the scope of the appended claims, construed as broadly as permissible in view of the prior art.

What I claim is:

1. Compounds selected from the group consisting of mono-magnesium and mono-alkaline earth metal salts of 2,2'-dihydroxy-3,5,6-3',5',6'-hexachloro diphenyl methane.

2. Mono-calcium salt of 2,2'-dihydroxy-3,5,6-3',5',6'-hexachloro diphenyl methane.

3. Mono-barium salt of 2,2'-dihydroxy-3,5,6-3',5',6'-hexachloro diphenyl methane.

4. Mono-magnesium salt of 2,2'-dihydroxy-3,5,6-3',5',6'-hexachloro diphenyl methane.

WILLIAM S. GUMP.